United States Patent [19]

Ashiba

[11] Patent Number: 4,591,186
[45] Date of Patent: May 27, 1986

[54] HYDRAULIC SHOCK ABSORBING DEVICE OF ADJUSTABLE DAMPING FORCE TYPE

[75] Inventor: Masahiro Ashiba, Kanagawa, Japan
[73] Assignee: Tokico Ltd., Kanagawa, Japan
[21] Appl. No.: 661,324
[22] Filed: Oct. 16, 1984
[30] Foreign Application Priority Data Oct. 20, 1983 [JP] Japan .................. 58-162344[U]

[51] Int. Cl.$^4$ ............................................. B60G 11/26
[52] U.S. Cl. .................................. 280/707; 267/64.18; 267/64.22; 280/689; 280/703; 280/714
[58] Field of Search ............... 280/702, 703, 706, 707, 280/714, 689; 267/64.18, 64.22

[56] References Cited

U.S. PATENT DOCUMENTS

| 3,827,538 | 8/1974 | Morgan | 188/319 |
|---|---|---|---|
| 3,831,969 | 8/1974 | Lindblom | 280/707 |
| 3,992,039 | 11/1976 | Hiruma | 280/703 |
| 4,065,154 | 12/1977 | Glaze | 280/707 |
| 4,333,668 | 6/1982 | Hendrickson et al. | 280/703 |
| 4,361,346 | 11/1982 | Harris | 280/707 |

FOREIGN PATENT DOCUMENTS 2119473 11/1983 United Kingdom .

Primary Examiner—John J. Love
Assistant Examiner—Kenneth R. Rice
Attorney, Agent, or Firm—Wenderoth, Lind & Ponack

[57] ABSTRACT

A hydraulic shock absorbing device of adjustable damping force type for use in a vehicle such as an automobile includes hydraulic dampers with the damping force thereof being adjustable between at least two, low and high damping force conditions, and a selective switching circuit operable by a driver of the vehicle for selectively determining the damping force condition of the dampers. At least one sensor is provided to detect the operating condition of the vehicle, such as the speed of the vehicle, the position of the gas pedal, the pressure in the braking system or the like, to generate a signal at a predetermined operating condition of the vehicle, and the signal is supplied to a control circuit for switching the dampers to the high damping force condition to override the switching circuit.

4 Claims, 6 Drawing Figures

HYDRAULIC SHOCK ABSORBING DEVICE OF ADJUSTABLE DAMPING FORCE TYPE

BACKGROUND OF THE INVENTION

This invention relates to a hydraulic shock absorbing device of adjustable damping force type for use in a vehicle such as an automobile.

Various hydraulic dampers of adjustable damping force type have been proposed and utilized in a vehicle such as an automobile to adjust the damping force characteristics thereof in accordance with the running or operating conditions of the vehicle such as when the vehicle is running at a high speed on a free way, when the vehicle is running on a paved road, and when the vehicle is running on a rough road or a gravel road and the like, thereby improving driving comfort and steering stability.

One typical hydraulic damper of adjustable damping force type includes a cylinder, a piston working in the cylinder and partitioning the interior of the cylinder into first and second liquid chambers, a hollow piston rod connected to the piston and extending through the first liquid chamber to the outside through one end of the cylinder, a damping force generating disc valve mechanism mounted on the piston, a by-pass passage including the interior of the hollow piston rod and by-passing the damping force generating disc valve mechanism, and a damping force adjusting mechanism for adjusting the effective passage area of the by-pass passage. The damping force adjusting mechanism comprises a control rod extending through the piston rod, an actuator such as a solenoid, an electric motor and the like connected to the outer end of the control rod, a shutter connected to the inner end of the control rod and being rotatable upon actuation of the actuator, and one or more orifice openings being selectively opened or closed in response to the rotation of the shutter.

In such prior art hydraulic shock absorbing device, a hand-operated switch has usually been provided so that a driver of the vehicle can determine the damping force of the vehicle as desired. However, in applying brakes rapidly or turning the steering wheel radically, it is preferable to set the shock absorbing device at a high damping force condition and, accordingly, an automatic switch has also been proposed to automatically set the device at the high damping force condition. The automatic switch is actuated by an electric signal generated from a sensor detecting a condition such as the hydraulic pressure in the hydraulic braking system, the rotating angle of the steering wheel or the like and actuates the actuator so as to rotate the shutter to the high damping force condition, thereby improving the safety of the vehicle.

However, there is a shortcoming in such shock absorbing device that when the actuator is actuated by the hand-operated switch to rotate the shutter toward the low damping force condition and the automatic switch is actuated by the sensor to rotate the shutter toward the high damping force condition, the operation of the actuator becomes indefinite and, in some cases, the shutter may sometimes rotates to the low damping force condition and, thereafter, to the high damping force condition, which situation cannot satisfy the requirement of the automatic switch.

SUMMARY OF THE INVENTION

The present invention has been made in view of the aforementioned said shortcoming in the prior art hydraulic shock absorbing device and provides a hydraulic shock absorbing device of adjustable damping force type for use in a vehicle, which comprises a hydraulic damper with the damping force thereof being adjustable between at least two, low and high damping force conditions, a selective switching circuit operable by a driver of the vehicle for selectively determining the damping force of the damper, at least one sensor for detecting an operating condition of the vehicle, such as the velocity, acceleration, deceleration, and the like, and a control device connected to the sensor for determining or providing the damping force of the damper at the high damping force condition and thus predominating over or overriding the switching circuit.

BRIEF DESCRIPTION OF THE DRAWINGS

The invention will hereinafter the explained in detail with reference to the accompanying drawings exemplifying a preferred embodiment of the invention, and in which.

DETAILED DESCRIPTION OF THE PREFERRED EMBODIMENT

Figure 1:
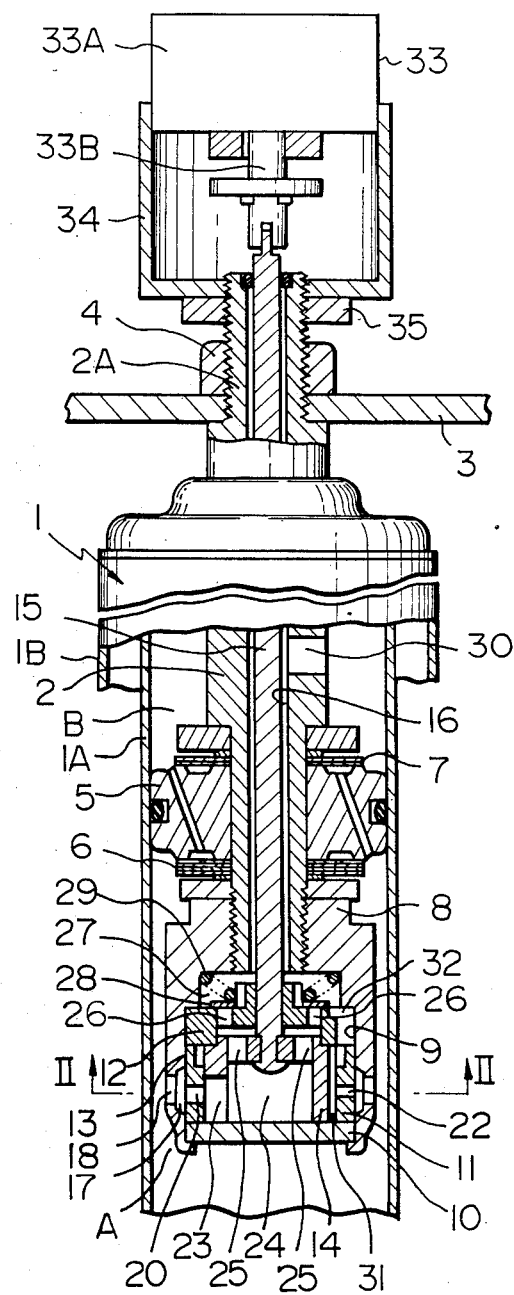
FIG. 1 is a partial longitudinal sectional view of a hydraulic damper of adjustable damping force type.

A hydraulic damper of adjustable damping force type shown in FIG. 1 comprises a main body 1 consisting of an inner tube 1A and a coaxial outer tube 1B. The inner tube 1A acts as a cylinder for slidably receiving therein a piston 5 which partitions the interior of the inner tube 1A into first and second liquid chambers B and A respectively. A piston rod 2 is secured to the piston 5 and extends through the first liquid chamber B to the outside. A reduced diameter screw-thread portion 2A is formed on the outer end portion of the piston rod 2, and is inserted through an opening in a chassis 3 of a vehicle such as an automobile and is secured thereto through a nut 4. A damping force generating disc valve 6 and a damping force generating disc valve 7 are provided on opposite side surfaces of the piston 5 to generate damping forces respectively in the extension stroke (upward movement of the piston rod 2) and in the contraction stroke (downward movement of the piston rod 2) of the damper.

A tubular member 8 is secured to the inner end of the piston rod 2 to act as a nut for securing the piston 5 and disc valves 6 and 7 on the piston rod 2 member 8 has defined therein a chamber 9 for receiving an adjustable damping force generating mechanism. A closure plate 10 is mounted on the tubular member 8 to close the chamber 9 from the second liquid chamber A. A guide 13 consisting of a passage forming portion 11 and a valve forming portion 12 is fitted and secured to the inner peripheral wall of the chamber 9 by such as force fitting or the like process. A shutter 14 is fitted in the guide 13 and is slidably rotatable relative thereto. A control rod 15 is secured to the shutter 14 and extends through a coaxial bore 16 in the piston rod 2 to the outside. The outer end of the control rod 15 is connected to a rotary actuator such as a solenoid, a stepping motor and the like 33 which will be described hereinafter.

Figure 2:
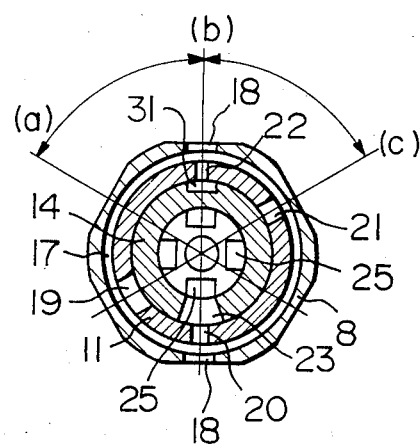
FIG. 2 is a sectional view taken along line II—II in FIG. 1.
Figure 3:
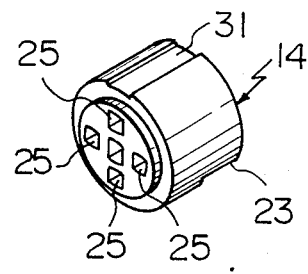
FIG. 3 is a perspective view of a shutter.

An annular space 17 is formed between the tubular member 8 and the passage forming portion 11 of the guide 13, and the space 17 is permanently communicated with the liquid chamber A through a plurality of openings 18. As shown in FIG. 2, four orifice passages 19, 20, 21 and 22 having respectively different passage areas are formed in the passage forming portion 11 and respective first ends of the orifice passages 19, 20, 21 and 22 open to the space 17 with respective second ends thereof opening on the sliding surface of the shutter 14. A slit or groove 23 is, as shown in FIGS. 2 and 3, formed in the circumferential wall of the shutter 14 for selectively opening the orifice passages 19 and 20 in response to the rotation of the shutter 14 to communicate the liquid chamber A with a liquid space 24 which is defined in the interior of the shutter 14. A plurality of openings 25, are formed in a canopy portion of the shutter 14 to communicate the liquid space 24 with a plurality of axial openings 26, which are formed in the valve forming portion 12 of the guide 13. A check valve 28 is provided to cooperate with the openings 26 in the valve forming portion 12 to permit liquid flow only from the liquid space 24 to a liquid chamber 27 which is formed between the valve forming portion 12 and the tubular member 8. The check valve 28 is biased toward a normal closed position by a coil spring 29. The liquid chamber 27 is permanently communicated with the liquid chamber B through the axial bore 16 and a radial opening 30 in the piston rod 2.

An axial groove 31 is formed in the outer circumferential surface of the shutter 14 as shown in FIGS. 2 and 3, and is selectively communicated with the orifice passages 21 and 22 in the passage forming portion 11 of the guide 13 in response to the rotation of the shutter 14. An axially extending groove 32 is formed in the outer circumferential surface of the valve forming portion 12 with the lower end thereof permanently communicating with the axial groove 31 irrespective to the rotation of the shutter 14, and the upper end of the groove 32 is permanently communicated with the chamber 27.

According to the aforesaid construction, there is formed an adjustable damping force generating mechanism which comprises a passing through valve passage consisting of openings 18 in the tubular member 8, the annular space 17, the orifice passage 19 or 20, the slit or groove 23 in the shutter 14, the liquid space 24, openings 25 in the shutter 14, openings 26 in the valve forming portion 12 of the guide 13, the check valve 28, the liquid chamber 27, and the axial bore 16 and the radial opening 30 in the piston rod 2; and a by-passing passage consisting of the openings 18, the annular space 17, the orifice passage 21 or 22, axial grooves 31 and 32 in the shutter 14 and the valve forming portion 12, the liquid chamber 27, the axial bore 16 and the radial opening 30. The effective passage area of the passing through valve passage is defined by the orifice passage 19 or 20, and the effective passage area of the by-passing passage is defined by the orifice passage 21 or 22. The orifice passages 19 and 21 are respectively larger than orifice passages 20 and 22, and orifice passages 19 and 20 are provided at locations angularly spaced from orifice passages 21 and 22 respectively, by 180 degrees. The grooves 23 and 31 in the shutter 41 are also angularly spaced by 180 degrees. When the shutter 14 is positioned as shown in FIG. 2 wherein the diametral line connecting the groove 31 with the groove 23 coincides with line b (the position b) the passing through valve passage opens with the passage area being defined by the orifice passage 20 and the by-passing passage opens at the orifice passage 22, and thus the adjustable damping force mechanism takes a small passage area position. When the shutter 14 is rotated in the clockwise direction by 60 degrees from the position shown in FIG. 2 to position c, the orifice passages 20 and 22 are closed and orifice passages 19 and 21 open. The mechanism takes a large passage area position and the damping force characteristics become soft. When the shutter 14 is rotated in the counterclockwise direction by 60 degrees from the position b, the orifice passages 19, 20, 21 and 22 are closed. The mechanism takes position a or a fully closed position and the damping force characteristics become hard.

The rotary actuator 33 acts to switch the adjustable damping force generating mechanism between positions a, b and c, or between respectively hard, normal and soft damping force positions. The rotary actuator 33 includes an actuator 33A such as a rotary solenoid, stepping motor or the like, and a rotary shaft 33B with one end being connected to the actuator 33A and the other end being connected to the outer end of the control rod 15. The rotary actuator 33 is mounted on a supporting member 34 which is screw-threadingly secured to the outer end of the piston rod 2. Shown at 35 in FIG. 1 is a lock nut.

Figure 6:
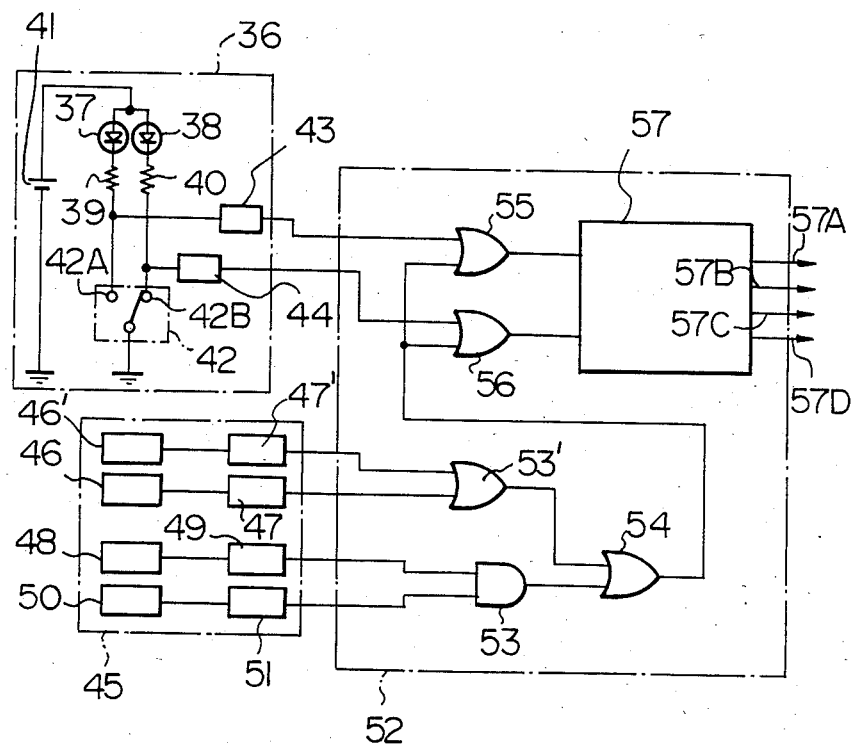
FIG. 6 is a wiring diagram of a selective switching circuit according to the invention.

Referring to FIG. 6, shown at 36 is an automatic switching circuit which comprises light emitting diodes 37 and 38 which are connected in parallel, resistances 39 and 40 which are connected respectively in series with diodes 37 and 38, a D.C. source 41 with one end thereof connected in series with diodes 37 and 38 and the other end thereof being grounded, a selector switch 42 with one end being grounded and the other end being selectively switched to a contact 42A connected with the resistance 39 and to a contact 42B connected with the resistance 40, an output circuit 43 connected between the resistance 39 and the contact 42A and being adapted to generate signal "1" when the contact 42A is open and the electric voltage is applied and to generate signal "0" when the contact 42A is closed, and an output circuit 44 connected between the resistance 40 and the contact 42B and being adapted to generate signal "1" when the contact 42B is open and to generate signal "0" when the contact 42B is closed. The selector switch 42 acts, in response to the manual operation of the driver of the vehicle, to select the damping force characteristics between the low damping force condition (soft) and medium damping force condition (normal) corresponding respectively to the contacts 42A and 42B.

Shown at 45 is a detecting portion which comprises, in the embodiment shown in the drawing, a brake pressure sensor 46 detecting hydraulic pressure in a hydraulic brake system or the hydraulic pressure in a wheel brake cylinder, an output circuit 47 for generating signal "1" when the brake pressure exceeds a predetermined level, a sensor 48 detecting the running velocity of the vehicle, an output circuit 49 for generating signal "1" when the velocity exceeds a predetermined level, a sensor 50 detecting the rotating angle of the steering wheel of the vehicle, and an output circuit 51 generating signal "1" when the rotating angle of the steering wheel exceeds a predetermined angle. Further, there are shown another sensor 46' which may, e.g., be a sensor detecting the acceleration or the deceleration acting on the vehicle in the longitudinal direction, detecting the acceleration acting on the vehicle in the transverse direction, detecting the displacement of the throttle lever or the gas pedal for controlling the engine of the vehicle, detecting the loading condition or the displacement of the suspension system of the vehicle, or the like, and an output circuit 47' for generating signal "1" in response to the sensor 46'.

Shown at 52 is a control circuit which comprises AND circuit 53 connected to the output circuits 49 and 51 for generating signal "1" when both circuits 49 and 51 generate signal "1", OR circuit 53' connected to the output circuits 47 and 47' for generating signal "1" when at least one of the circuits 47 and 47' generates signal "1", OR circuit 54 connected to circuits 53 and 53' for generating signal "1" when signal "1" is received from at least one of the circuits 53 and 53', OR circuit 55 connected to the circuit 54 and the circuit 43 of the switching circuit 36 for generating signal "1" when signal "1" is received from at least one of the circuits 54 and 43, OR circuit 56 connected to the circuit 54 and the circuit 44 of the switching circuit 36 for generating signal "1" when signal "1"is received from at least one of the circuits 54 and 44, and a control portion 57 connected to the circuits 55 and 56. The control portion 57 has four output lines 57A, 57B, 57C and 57D which are connected respectively with respective rotary actuators (not shown) of four hydraulic dampers provided on the vehicle to selectively determine the damping characteristic of each hydraulic damper among hard, normal and soft conditions. The relationship between signals of the circuits 55 and 56 and the output signal of the control portion is shown in Table 1.

TABLE 1

| Output signal 55 | Output signal 56 | Output signal 57 |
| --- | --- | --- |
| 1 | 1 | Hard High Damping Force |
| 1 | 0 | Normal Medium Damping Force |
| 0 | 1 | Soft Low Damping Force |

The operation of the hydraulic shock absorbing device according to the invention will hereinafter be explained.

Figure 4:
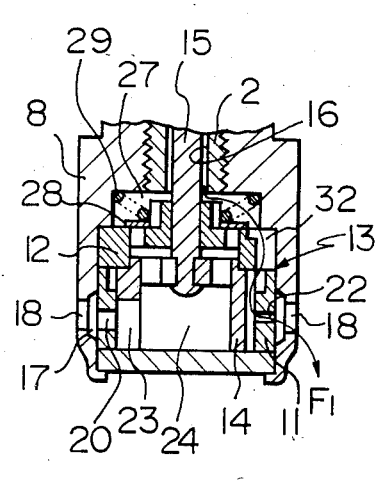
FIG. 4 and FIG. 5 are explanatory views showing respective operational conditions of a damping force adjusting mechanism incorporated in the damper of FIG. 1.

When the selector switch 42 is connected to the contact 42B for the normal condition and sensors 46, 46', 48 and 50 do not detect respective threshold conditions for generating signals, then the circuits 44, 47, 47', 49 and 51 generate respectively signals "0", and the circuit 43 generates signal "1". Accordingly, the circuit 55 generates signal "1" and the circuit 56 generates signal "0". The control portion 57 actuates the rotary actuator 33 to determine the medium damping force condition as shown in Table 1, and the shutter 14 takes the position b as shown in FIG. 2. In the extension stroke of the damper, the piston 5 and the piston rod 2 displace in the upward direction with respect to FIG. 1. The pressure in the liquid chamber B is elevated, and the liquid in the chamber B flows through the opening 30 and the bore 16 into liquid chamber 27. The check valve 28 is maintained at the closed condition, thus the passing through valve passage is not formed, and the liquid in the chamber 27 flows into the liquid chamber A along the line $F_1$ (FIG. 4) which passes through the groove 32, groove 31, the orifice passage 22, the annular space 17 and openings 18 constituting the by-passing passage. The orifice passage 22 acts to generate a predetermined damping force. It will be understood that when the speed of the piston rod 2 is increased and the pressure in the chamber B exceeds a predetermined pressure, the disc valve 6 opens, which generates a substantial part of the damping force.

Figure 5:
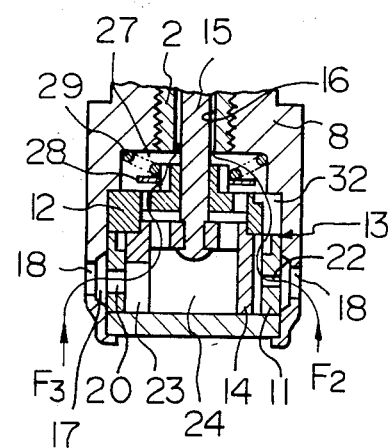

During the contraction stroke of the damper, the piston 5 and the piston rod 2 displace in the downward direction with respect to FIG. 1, and the pressure in liquid chamber A elevates as compared with the pressure in liguid chamber B. The liquid in the chamber A flows through openings 18 and the annular space 17 and, as shown by arrow line $F_2$ in FIG. 5, through the by-passing passage consisting of the groove 31, the groove 32, the chamber 27, the bore 16 and the opening 30 into the liquid chamber B. Further, the liquid in the chamber A flows through the passing through valve passage consisting of, as shown by arrow line $F_3$ in FIG. 5, the openings 18, the space 17, the orifice passage 20, the slit 23 in the shutter 14, the space 24, openings 25, openings 26, the space between the valve seat and the check valve 28 being opened, the chamber 27, and the bore 16 and the opening 30 in the piston rod 2, into the liquid chamber B. The orifice passages 20 and 22 define the damping force. When the speed of the piston rod 2 increases sufficiently to open the disc valve 7, the damping force is mainly determined by the disc valve.

When the selector switch 42 is switched to the contact 42A for the soft damping condition, the circuit 43 of the switching circuit 36 generates signal "0", and the circuit 44 generates signal "1". Assuming that the circuits 47', 47, 49 and 51 do not generate signal "1", then the circuit 54 generates signal "0" and the circuit 55 generates signal "1". Thus, the controlling portion 57 actuates the rotary actuator 33 to rotate the shutter 14 into the low damping force position or the position c in FIG. 2. The by-passing passage which opens both in the extension and contraction strokes has the effective passage area defined by the orifice passage 21 and, the passing through valve passage which opens only in the contraction stroke has the effective passage area defined by the orifice passage 19. The orifice passages 21 and 19 are respectively larger than the orifice passages 22 and 20 in the normal condition, and thus the damping characteristics both in the extension and contraction strokes are more gradient than that of the normal condition, and this condition is defined as a soft condition. Further, the disc valve 6 or 7 will open when the speed of the piston increases and the pressure difference between the chambers A and B exceeds a predetermined pressure, but the damping force at that condition is smaller than that of the normal condition since the liquid flow passing through the adjustable damping force generating mechanism during the soft condition is larger than that in the normal condition.

As described heretofore, it is possible to manually move the selector switch 42 between the normal and soft conditions or medium and low damping force conditions but, according to the invention there are provided sensors for detecting the running conditions of the vehicle which control the condition of the damper or the position of the shutter 14 predominantely over the selector switch 42.

Assuming that the selector switch 42 is switched from the contact 42B to the contact 42A and the actuator 33 is rotating toward the position c in FIG. 2, and that at such condition an emergency brake is applied, then the hydraulic pressure in the brake system exceeds a predetermined level which is detected by the sensor 46, and the output circuit 47 generates signal "1". The circuit 54 generates signal "1", both circuits 55 and 56 generate signal "1", and the control portion 57 actuates, irrespective to the position of the selector switch 42, the rotary actuator 33 into the high damping force position or the position a of the shutter 14. The passing through valve passage and the by-passing passage in the adjustable damping force generating mechanism are maintained closed both in the extension and contraction strokes and the damping force characteristics are the largest. Thus, it is possible to prevent a so-called nose diving phenomenon wherein the shock absorbers relating to the front wheels contract excessively due to emergency braking. Although this embodiment contemplates that all four dampers are changed to the hard condition upon applying emergency braking, it is possible to control only the dampers of the front wheels in such condition.

In the illustrated embodiment, the sensor 48 detecting the speed of the vehicle and the sensor 49 detecting the steering angle are connected through AND circuit 53, and thus the circuit 53 generates signal "1" only when the speed of the vehicle exceeds a predetermined and the steering angle exceeds a predetermined angle. At that condition, the damping force of the dampers is switched automatically to the hard condition, and the so-called spinning phenomenon can reliably be prevented and the steering property and safety of driving can reliably be improved.

Further to the aforesaid sensors, it is possible to provide sensors for detecting the following conditions:
(a) the displacement of the brake pedal, the energization of a brake lamp circuit, or deceleration in the frontward direction for detecting emergency braking or the deceleration of the vehicle,
(b) the acceleration in the transverse direction for detecting the turning of the vehicle alternatively to the aforesaid combination of the sensor 48 detecting the speed of the vehicle and the sensor 50 detecting the steering angle, for detecting turning of the vehicle,
(c) the acceleration in the forward direction, or the combination of the sensor detecting the speed of the vehicle and the sensor detecting the displacement of the throttle lever or the gas pedal, for detecting the acceleration in the forward direction,
(d) the vertical displacement of the suspension system for detecting the loading condition,
(e) the combination of the sensor detecting the velocity of the vehicle and the sensor of item (d) for adjusting the damping force to match with particular conditions of the road.

The sensors of item (a) are utilized to prevent the nose dive phenomenon as described heretofore, the sensors of item (b) are utilized to prevent the rolling phenomenon in the transverse direction, and the sensors of item (c) are effective to prevent the squatting phenomenon wherein the tail or the rear wheel dampers contract excessively due to abrupt acceleration of the vehicle. Further, it is possible to utilize the sensor detecting the speed of the vehicle such that the sensor generates signal "1" when the speed detected by the sensor is lower than a predetermined speed for determining the damping force characteristics to high damping force condition, whereby the acceleration of the vehicle can be performed smoothly.

As described heretofore, according to the invention, the damping force characteristics of the hydraulic shock absorbing device can be set automatically to the hard condition in response to various sensors detecting the operating conditions of the vehicle and predominantly over the manually operable switching circuit, and thus the safety and maneuverability of the vehicle can be improved.

What is claimed is:

1. A hydraulic shock absorbing device of adjustable damping force type for use in a vehicle, said device comprising:
   a hydraulic damper with the damping force thereof being adjustable between at least two, low and high damping force conditions;
   selective switching circuit means operable by a driver of the vehicle for selectively determining the damping force of the damper;
   at least one sensor means for detecting an operating condition of the vehicle; and
   control means connected to said sensor means for adjusting the damping force of said damper to said high damping force condition, in response to a predetermined operating condition of the vehicle detected by said sensor means, and thereby to predominate over said switching circuit means.

2. A hydraulic shock absorbing device according to claim 1 wherein said sensor means comprise a pressure sensor detecting the hydraulic pressure in a brake cylinder and a sensor detecting the velocity of the vehicle.

3. A hydraulic shock absorbing device according to claim 1 wherein said sensor means comprise a sensor detecting the speed of the vehicle and a sensor detecting the rotating angle of a steering gear or a steering wheel.

4. A hydraulic shock absorbing device according to claim 1 wherein said sensor means comprise a sensor detecting the position of an accelerator pedal or a throttle lever.

* * * * *